United States Patent [19]

Angehrn et al.

[11] Patent Number: 4,662,650
[45] Date of Patent: May 5, 1987

[54] VEHICLE CHASSIS

[75] Inventors: Guido Angehrn, Zürich; Manfred Utz, Affoltern a.A., both of Switzerland

[73] Assignee: Swiss Aluminium Ltd., Chippis, Switzerland

[21] Appl. No.: 810,084

[22] Filed: Dec. 17, 1985

[30] Foreign Application Priority Data

Dec. 20, 1984 [CH] Switzerland .................. 6122/84

[51] Int. Cl.$^4$ ............................................ B62D 21/02
[52] U.S. Cl. .................................. 280/789; 280/785; 280/800
[58] Field of Search ............... 280/781, 785, 796, 800, 280/789

[56] References Cited

U.S. PATENT DOCUMENTS

| | | | |
|---|---|---|---|
| 2,621,059 | 12/1952 | Ridgway | 280/789 |
| 2,622,895 | 12/1952 | Larsen | 280/789 |
| 3,096,996 | 7/1963 | Cole | 280/789 |
| 4,093,253 | 6/1978 | Lehr | 280/789 |
| 4,232,884 | 11/1980 | DeWitt | 280/800 |

FOREIGN PATENT DOCUMENTS

1062389 4/1954 France ........................ 280/785

Primary Examiner—John J. Love
Assistant Examiner—Kenneth R. Rice
Attorney, Agent, or Firm—Bachman & LaPointe

[57] ABSTRACT

An aluminum chassis for road or railway vehicles is such that the transverse beams are continuous and are attached to the longitudinal beams by means of angle-pieces using threaded bolts and nuts or, in particular, parallelogram-shaped nuts. The transverse beams and, if desired, the longitudinal sections of the frame—which can also function as longitudinal beams—feature undercut channels in which the nuts engage. This type of construction offers various advantages that are realized in the assembly of the chassis and in repairing damaged vehicles.

10 Claims, 13 Drawing Figures

VEHICLE CHASSIS

BACKGROUND OF THE INVENTION

The present invention relates to a chassis for vehicles, in particular such a chassis made of aluminum alloy, having longitudinal beams and, penetrating these, transverse beams, and also having an outer frame the whole being to accommodate flooring running in the longitudinal direction.

Known aluminum chassis of this kind feature as the main component parts two longitudinal beams and a number of transverse beams which are in the form of extruded sections of round cross-section spaced a suitable distance from each other; the said transverse sections hold the longitudinal beams together and, with an intermediate supporting surface of sections clipped onto them, accommodate and support the longitudinally mounted flooring sections.

In particular in the case of chassis for lighter vehicles the longitudinal sections of the outer frame are simultaneously the longitudinal beams, and the transverse beams are joined end-on. The outer frame also features two transverse sections. This is described as a chassis with outer-lying load-bearing frame.

In the case of chassis of another type, in particular for heavy vehicles, there are special longitudinal beams which act as the main longitudinal supports and are positioned a distance from the longitudinal sides of the chassis; in that case the outer frame is formed by two special longitudinal frame sections and two transverse sections. The latter sections pass through openings made in the web of the longitudinal beams, such that their ends meet the longitudinal sections of the outer frame. This is known as a chassis with inner-lying load-bearing frame.

With both kinds of aluminum chassis it was normal up to now—as with steel chassis—to join the longitudinal and transverse beams and the longitudinal and transverse sections of the frame by welding and namely such that the weld beads ran round the transverse beams.

Although such welded aluminum chassis were satisfactory from the point of view of strength, it has been found that in practice they give rise to some difficulties. First, the welds between the ends of the transverse beams and the outer frame sections detract from the appearance of the visible, outermost side of these sections. Further, the amount of welding required is time-consuming. In particular, however, if the vehicle is damaged e.g. in an accident, then the repair work is complicated and very time-consuming.

The object of the present invention is therefore to develop a new type of construction for an aluminum chassis such that the joining of the transverse beams to the longitudinal beams and sections of the frame is made easier and likewise such that the repair work needed after traffic accidents is also easier.

SUMMARY OF THE INVENTION

The foregoing object is achieved by way of the invention wherein the transverse beams feature at least one undercut channel and are secured to the longitudinal beams and/or outer frame longitudinal sections by angle-pieces, such that one flange of the angle-piece is secured, by means of a threaded bolt and a nut engaging behind the edges of the undercut groove, to a—as seen in the assembled state—vertical side of the transverse beams, and the other flange of the angle-piece is bolted to the web of the longitudinal beam and/or outer frame longitudinal section by means of a threaded bolt, and secured by a nut engaging behind the edges of the undercut channel.

The welded joints in the vehicle chassis are, according to the invention, replaced by releasable, easy-to-assemble bolted joints.

As such, on the transverse beam, the undercut channels are usefully situated at least at one of the sides of the beam which is vertical in the assembled state so that essentially simple L-shaped angle-pieces can be employed. It is however also possible, if the height of the web of the longitudinal beams permits, to position the undercut channel on the lower side of the transverse beam. In such a case simple L-shaped angle-pieces can likewise be used, the other flanges of which can be joined to the longitudinal beam below the transverse beam, or else e.g. saddle-shaped angle-pieces with flanges extending on both sides of the transverse beam for securing to the longitudinal beam.

The transverse beams employed according to the invention can be open or, advantageously, hollow sections. As such they can be four-cornered e.g. quadratic in cross section, if desired with greater or lesser degrees of rounding-off.

The nuts which engage behind the channels are usefully parallelogram-shaped clamping pieces which, with respect to their height, are smaller than the width of the opening slit of the channel. The clamping pieces can be pre-mounted, with the threaded bolts, on the angle-pieces and their longitudinal direction oriented in the direction of the flange of the angle-piece. The pre-mounted angle-pieces can then be introduced from the front into the two sections that are to be joined and screwed so that the clamping piece turns and is anchored securely in the undercut channel. The pre-mounted angle-pieces permit trouble-free assembly in all positions. In particular; when an undercut channel is vertical or almost vertical, easy assembly is made possible only by using pre-mounted angle-pieces.

The chassis according to the invention can be employed for vehicles of all kinds e.g. road vehicles such as lorries, trailers, semi-trailers or rail-bound vehicles, especially goods trucks, with the chassis supporting for example platform or van superstructures or cooling units.

BRIEF DESCRIPTION OF THE DRAWINGS

Further details of the invention are described in the following detailed description with the aid of exemplified embodiments relating to a chassis with inner-lying frame shown schematically in the figures wherein

FIG. 7: A longitudinal section of the outer frame with transverse beam attached to it end-on.

DETAILED DESCRIPTION

Figure 1:
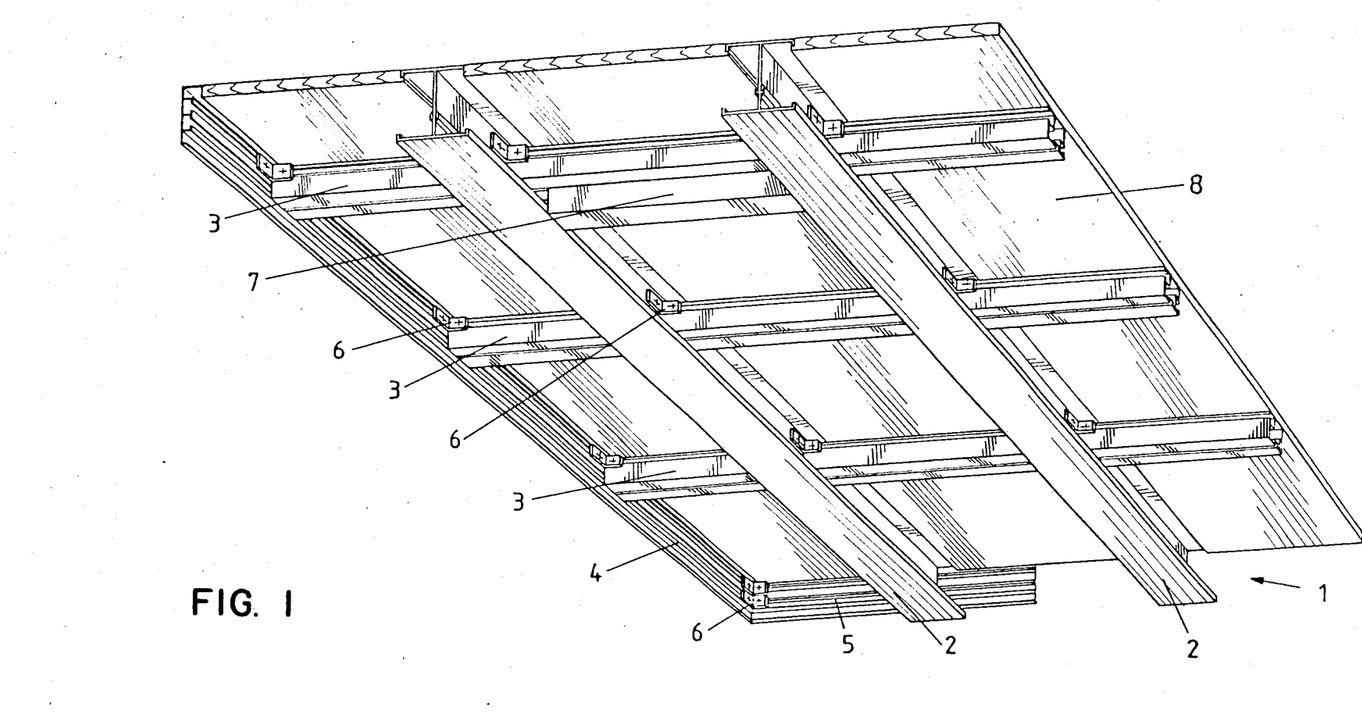
FIG. 1: A perspective view of a section of a chassis according to the invention having an inner-lying frame, as viewed from below.

As can be seen from FIG. 1 the chassis 1 comprises essentially two longitudinal beams 2, a plurality of transverse beams 3 and an outer frame made up of two longitudinal sections 4 and two transverse sections 5 (only shown in part here). These parts are joined securely together by bolted angle-pieces 6. Where necessary e.g. in the region of the axle mounting, saddle supports and crown pins, the transverse beams can be accompanied by transverse braces 7 mounted between the longitudinal beams. The load-carrying platform is formed by longitudinal flooring planks or sections 8 e.g. of wood or aluminum which are mounted on the transverse beams and are interrupted only by the closely aligned upper surface 33 of the longitudinal beams.

Figure 2:
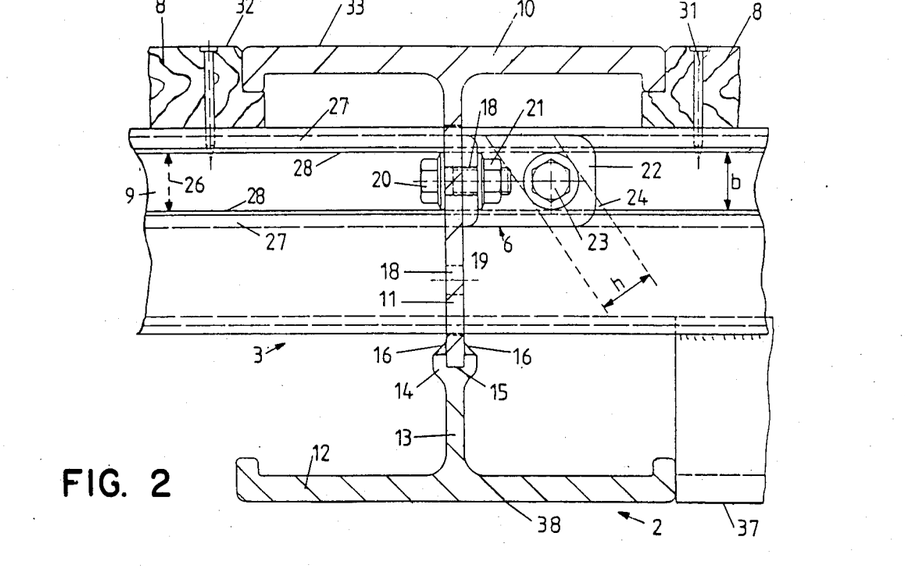
FIG. 2: A junction point between transverse beam and longitudinal beam, showing the longitudinal beam in cross-section.
Figure 3:
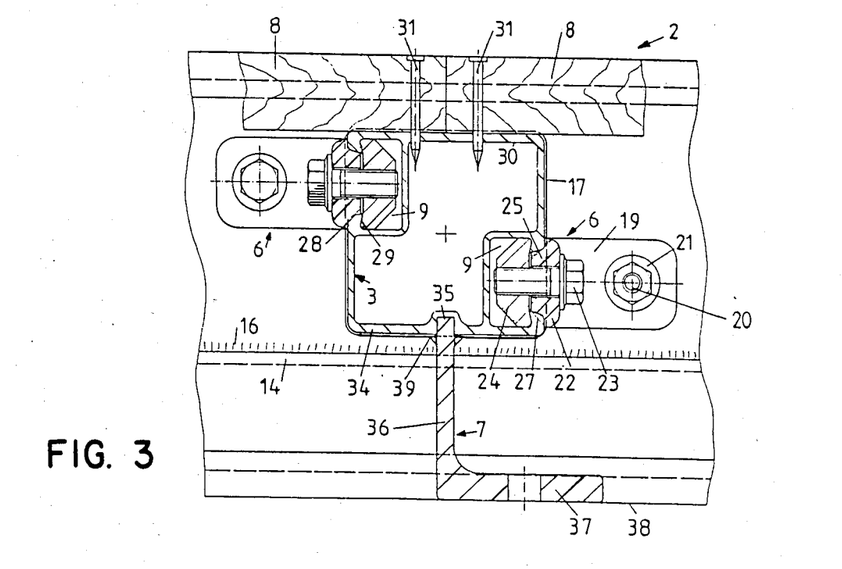
FIG. 3: The same junction joint, however showing the transverse beam in cross-section.

The new design of the transverse beams 3 and the mode of joining to the longitudinal beams 2 can be seen in FIGS. 2 and 3: In that version the transverse beam 3 is essentially in the form of a rectangular hollow beam with rounded edges. On both of its sides which are vertical when in the assembled state there is an undercut channel 9. These channels 9 are situated in two diagonally facing corners of the beam.

The longitudinal beams 2 shown in FIGS. 2 and 3 have been specially developed for semi-trailers and vary in a height along their length (swans' neck shape). They comprise an upper T-section 10 with relatively high web 11 and a lower T-section 12 with shorter web 13 the free end of which features a thicker cross-section 14 containing a groove 15. The desired different web heights are obtained by cutting the web 11 of the upper T-section 10. After introducing the web 11 of the uper part into the groove 15 of the lower T-section 12, both parts are joined together by weld seams 16. Longitudinal beams with constant web height, regardless of whether made of two joined parts or one single piece, are of course also embraced by the present invention.

For the manufacture of the chassis openings 17 of appropriate shape are made in the web 11 of the longitudinal beam 2 to admit the transverse beam 3; likewise holes 18 for threaded bolts are made there by stamping-out, drilling or milling.

The attachment of the transverse beam 3 to the longitudinal beam 2 is made via angle-pieces 6, the flanges 19 of which are secured by threaded bolts 20 and nuts 21 to the web 11 of longitudinal beam 2 and their flanges 22 are secured in the channels 9 of transverse beam 3 via threaded bolts 23 and nuts 24. The threaded bolts 20, 23 are preferably of the self-locking kind.

These angle-pieces 6 are such that one flange 19 features a flat contact surface to rest against the flat surface of the web 11 of the longitudinal beam 2. The other flange 22 features an elongated projection 25 which fits securely in the slit 26 of breadth b in the channel 9 and ensures no rotation takes place between the angle-piece and the transverse beam 3. The nut for the corresponding threaded bolts 23 is a parallelogram-shaped nut 24 of height h, which can be introduced from the front through the slit 26 in the channel 9, rotates about 54° when the bolt is tightened, engages on the projecting edges 27 of the undercut channel 9 and clamps into place.

The surfaces 28 of edges 27 facing the slit 26 and the corresponding, contacting faces of the projection 25 on the angle-piece flanges 22 are preferably slightly inclined towards the centre part of the floor of the channel 9, and in such a way that the projection 25 fits exactly into the slit 26. This causes the angle-piece 6 to position itself correctly as the threaded bolt 23 is tightened. Further, the inner faces 29 of the edges 27 and the contacting faces of the nut 24 are slightly inclined towards the interior of the channel. These measures improve the anchoring of the angle-pieces to the transverse beam 3.

The surface of the transverse beam which faces upwards in the assembled state serves as a flat support surface 30 for the planks or sections 8 forming the load-bearing platform. Such wooden planks or aluminum sections can be secured to the transverse beams 3 e.g. by nails 31, screws or rivets. The upper surface 32 of the palnks 8 are flush with the upper surface 33 of the longitudinal beam which also forms part of the loading platform area.

Further, the transverse beam 3 can be provided on its bottom face 34 with a groove 35 which, if necessary for the transverse beam in question, serves to accommodate the end of the web 36 of a transverse section 7 e.g. in the form of an angle or T-section that runs between the longitudinal beams 2 with its bottom face 37, if necessary, flush with the bottom face 38 of the longitudinal beams 2. This transverse section 7 is, in the present case, welded to the transverse beam 3 by weld seams 39.

Transverse beams 3 of essentially quadratic cross-section, as shown in FIG. 3, require a corresponding angular opening 17 to be made in the web 11 of the longitudinal beam 2. Such angular openings can, to a greater or lesser extent, be a disadvantage because of the stress concentrations arising at the corners.

Figure 4:
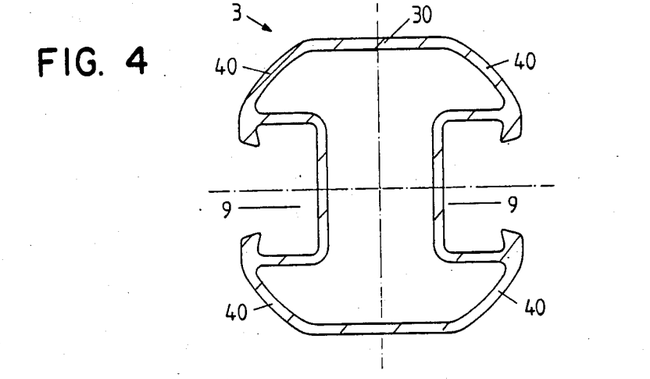
FIGS. 4–6: Three variants of the transverse beam shown in cross-section.

FIG. 4 shows a transverse beam 3 which takes this into account in the form of highly rounded corners which in cross-section result in each rounded part 40 representing about ¼ of the breadth of the beam. Accordingly, the openings in the web of the longitudinal beam can be formed with rounded corners. This transverse beam 3 features two undercut channels 9 which are opposite each other and at the same level.

Figure 5:
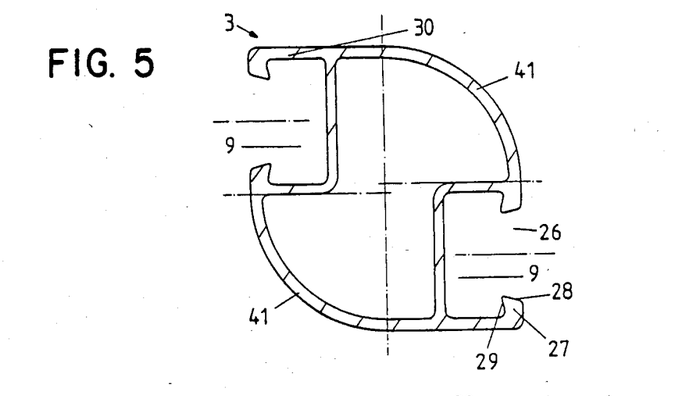

Another version with rounded parts is shown in FIG. 5. The transverse beam 3 features two diametrically disposed rounded parts 41 which account for about half of the section breadth, and also features two diametrically disposed undercut channels 9.

It is also within the scope of the invention for the rounded parts 40, 41 to represent a different fraction of the section breadth and to have a different shape.

In both versions as shown in FIGS. 4 and 5 there is a flat area at the top of the transverse beam which acts as a support surface 30 for the planks or sections 8 which are laid longitudinally.

In the versions described above the transverse beam is shown as a hollow beam; this is however not absolutely necessary.

Figure 6:
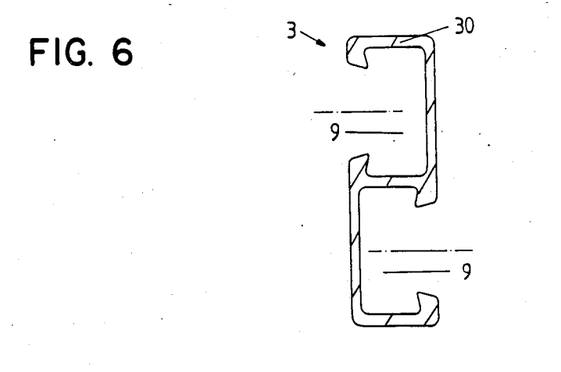

Shown in FIG. 6 is another possible version in which the transverse beam 3 is in the form of an open section. This transverse beam is S-shaped in cross-section and features two undercut channels 9, one on each vertical side of the beam. It likewise offers a flat support surface 30 for the flooring. In contrast to FIG. 6 it would also be possible to employ an E-shaped cross-section i.e.

with both undercut channels 9 opening on the same vertical side of the section.

In the versions according to FIGS. 4 to 6 the transverse beam 3 can be provided at the bottom with a groove 35, as shown in FIG. 3.

With respect to transmission of forces, especially in the case of transverse beams 3 without transverse sections 7, the load to be borne by the platform is transmitted via the upper part of the vertical sidewalls of the transverse beam to the angle pieces 6 and from there via the threaded bolts 20 to the longitudinal beams 2.

In view of this the openings 17 in the webs 11 of the longitudinal beams 2 are usefully dimensioned slightly larger than required by the cross-section of the transverse beam 3 so that there is some play between the transverse beams 3 and the longitudinal beams 2, for example 0.5–1 mm. This is made so in order to avoid friction between these components due to loading or torsion of the chassis while in service.

In connection with the described transverse beams it is advantageous to employ for the outer frame sections which likewise feature undercut channels on the inner facing side; these channels permit these sections to be joined via angle-pieces to the ends of the transverse beams and the frame sections to be joined together at the corners of the frame, again using angle-pieces.

Figure 7:
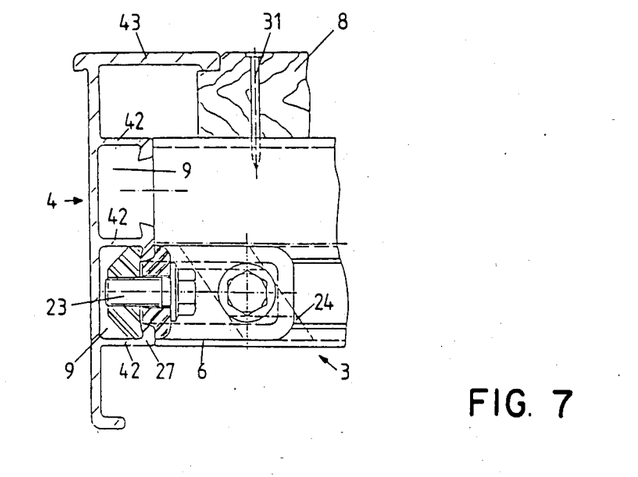
Figure 8:
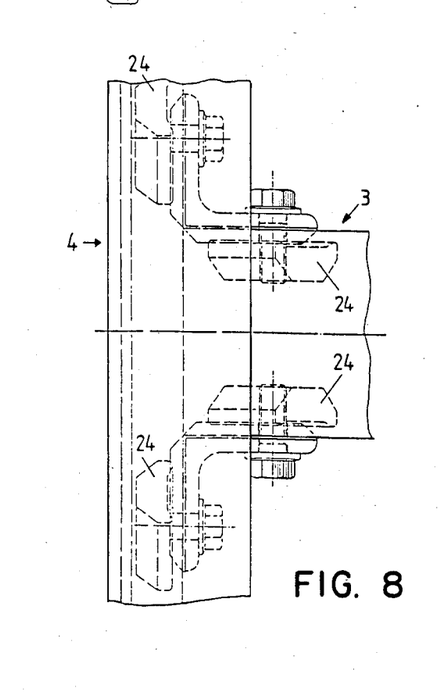
FIG. 8: The same joint shown in plan view.
Figure 9:
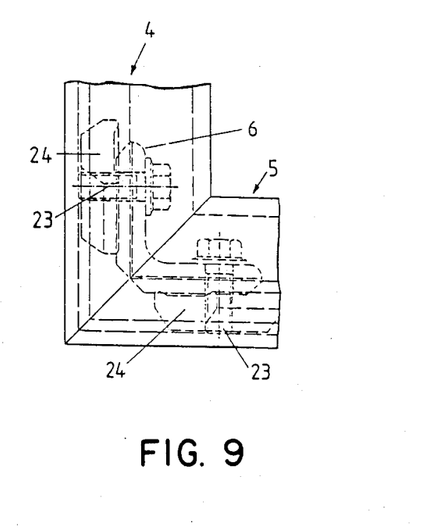
FIG. 9: A corner of the outer frame showing longitudinal and transverse sections joined together.

An example of this is shown in FIGS. 7, 8, and 9.

As shown in cross-section in FIG. 7 the longitudinal section 4 of the outer frame features on its inner facing side three longitudinal ribs 42 which together form two undercut channels 9 similar in shape to those of the transverse beam. Such a section 4 is intended for assembly with transverse beams 3 according to FIGS. 3, 5 or 6 having two undercut channels 9 at different levels. In the case of transverse beams with channels 9 at the same level, as shown for example in FIG. 9, outer frame sections with two longitudinal ribs 42 which delimit a single undercut channel 9. Further, the outer frame section 4 features an upper flange 43, which forms the edge of the loading platform.

The plan view in FIG. 8 shows the position of the angle pieces 6 where the end of a transverse beam 3 is joined to a longitudinal section 4 of the outer frame.

The plan view in FIG. 9 shows how the mitred ends of the longitudinal and transverse sections 4 and 5 resp. of the outer frame meet at the corner and the similar cross-sections can be joined by means of similar angle pieces 6.

Angle pieces which feature on both flanges a projection 25 that fits into the slit-shaped opening, and nuts 24 that engage on each threaded bolt behind the edges 27 of the channels, are employed to join the longitudinal sections of the outer frame to the transverse beams and to the transverse sections of the frame.

Figure 10:
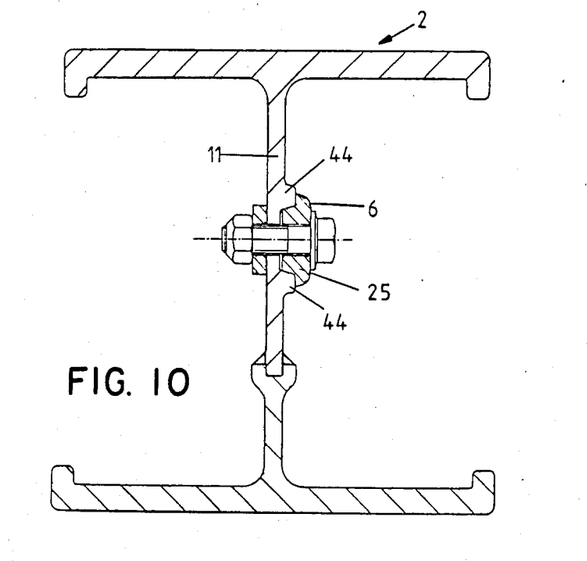
FIGS. 10/11: Two versions of the longitudinal beam shown in cross-section.
Figure 11:
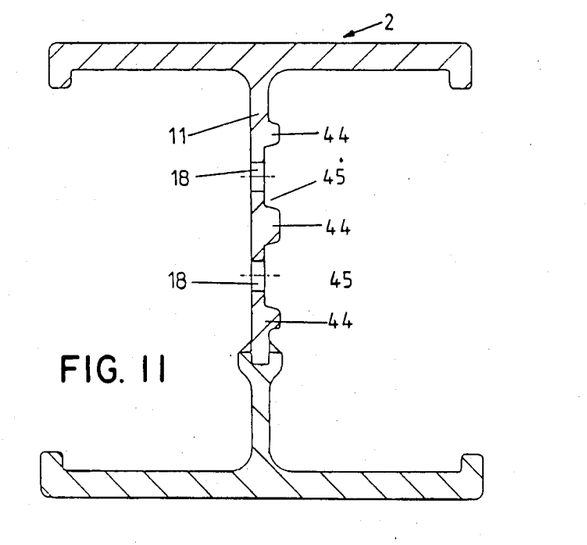

Further, as shown in FIGS. 10 and 11, it is useful to provide the extruded longitudinal beams 2 with longitudinal ribs 44 on one side of the web 11.

In the version according to FIG. 10 the longitudinal beam 2 features two longitudinal ribs 44 and is therefore to be employed with transverse beams 3 having two channels 9 at the same level such as in FIG. 4. In the version according to FIG. 11 the longitudinal beam 2 features three longitudinal ribs 44 and is therefore intended for transverse beams with channels 9 at different heights, such as shown in FIGS. 3, 5 or 6.

When employing such longitudinal beams 2 with longitudinal ribs 44 one can then use angle-pieces 6 which exhibit a projection 25 on both flanges. One of these projections 25 fits into the alignment groove 45 between these longitudinal ribs 44 with the result that the lower rib in question is able to some extent to bear the load from the platform.

Accordingly, the longitudinal beams 2 are manufactured such that the distance between the longitudinal ribs 44 and the height of the ribs are of such dimensions that faces on both sides of the projections 25 are supported on the said ribs 44.

Longitudinal beams 2 featuring longitudinal ribs 44 offer the advantage that the same kind of angle-pieces 6 with projections 25 on both flanges can be used everywhere viz., both for joining the longitudinal sections of the outer frame to the transverse sections of the frame and the transverse beams and for joining the transverse beams to the longitudinal beams.

It is obvious that with longitudinal sections of the outer frame, and if desired with longitudinal beams as shown in FIGS. 10 and 11, the longitudinal ribs 42 and 44 resp. must be situated at the proper height with respect to the load bearing surface of the platform.

In the case of chassis of the kind described at the start viz., with load bearing frame i.e. without the inner-lying frame with central longitudinal beams as shown in FIG. 1, the longitudinal sections 4 of the frame take over the function of the longitudinal beams. The longitudinal sections 4 of the frame can then be designed such that they are essentially open sections such as described with the aid of FIG. 7. As required i.e. to achieve higher strength, they can however also be in the form of hollow sections. Essential in the case of such longitudinal frame sections acting as longitudinal beams is that they feature, on their inner-facing side, one or two undercut channels by means of which they can be joined to the transverse beams of the kind described using angle-pieces of the kind described.

For both types of chassis viz., those with outer load-bearing frame and those with inner load-bearing frame, transverse beams with two channels 9 at different heights e.g. as in FIGS. 3, 5 or 6 offer the advantage over transverse beams as in FIG. 4 with both channels 9 at the same height, that the longitudinal sections of the frame as well as the central longitudinal beams can be joined to the transverse beam 3 by means of angle-pieces fitted at different heights. The result is then a more stable junction having no tendency to tilt.

Figure 12:
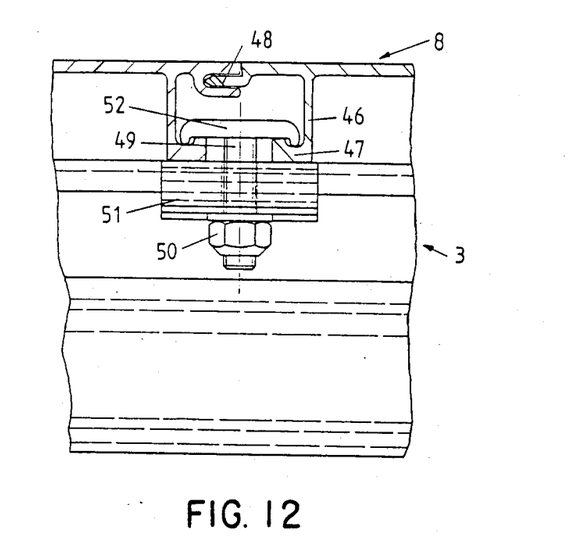
FIGS. 12/13: A manner of attaching aluminum flooring sections to the transverse beam, showing the beam in transverse cross-section and the flooring in longitudinal cross-section.
Figure 13:
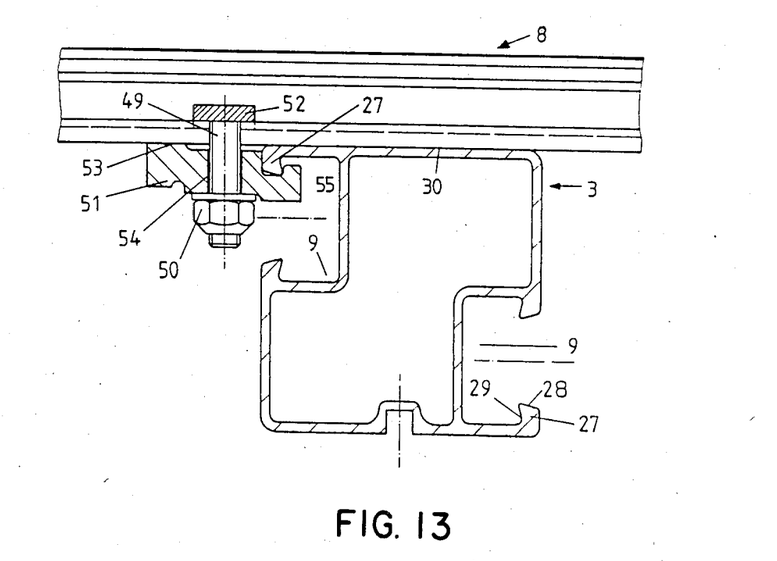

Shown in FIGS. 12 and 13 is a particularly advantageous manner of attaching flooring sections 8 of aluminum, mounted on an aluminum chassis according to the invention. Such profiled flooring sections 8 feature supporting ribs 46 with a foot 47 at its end and can interlock edge to edge via tongue and groove joints 48. They can be easily secured to the transverse beam 3 by means of threaded bolts 49 and nuts 50 along with a clamping piece 51. To this end the threaded bolt features a specially shaped head 51 which engages with the feet 47 of sections 8. This clamping piece 51 has on one side, as seen in FIG. 13, a contact face 53 which is braced against the flooring section, a bore 54 for the threaded bolt 49, and on the other side a projection 55 which engages behind the edge 27 of an undercut channel 9. Such a clamping attachment can be used particularly elegantly with transverse beams 3 which feature an undercut channel 9 in an upper corner. This provides a further advantage of transverse beams 3 with channel 9 situated at their corners.

Such flooring sections 8 can, in the same manner, be attached at their ends to the upper ribs 42 of the transverse sections of the outer frame.

In general the described invention realises the following advantages:

(1) Time-saving in the manufacture of the chassis, in particular due to the pre-mounted angle-piece.
(2) Possibility of supplying pre-fabricated components and therefore easier assembly of the chassis without expensive devices.
(3) Always the same quality of bolted connection of the transverse beam to the longitudinal beams and to the outer frame, instead of welded joints which involve much more effort to be obtained with good quality.
(4) Finally, if a bolted version is used then the outer frame can be anodised.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A chassis for vehicles comprising a plurality of longitudinal beams, a plurality of transverse beams penetrating said plurality of longitudinal beams and an outer frame surrounding said plurality of longitudinal and transverse beams to form a support to accommodate flooring sections, the improvement which comprises said transverse beams feature at least one undercut channel and are secured to said longitudinal beams and said outer frame by angle-pieces, such that one flange of the angle-piece is secured by means of a threaded bolt and a nut engaging in said undercut channel to a side of said transverse beams and the other flange of the angle-piece is bolted to said longitudinal beam by means of a threaded bolt and nut.

2. A chassis according to claim 1 wherein, in the assembled state, the upper lying face of the transverse beam is in the form of a flat supporting surface for flooring sections such that the flat supporting surface preferably extends over only a part of the breadth of the transverse beam and on one or both sides of this supporting surface the transition to the vertical sidewalls of the transverse beam is made via curvatures.

3. A chassis according to claim 2 wherein the transverse beams feature on their bottom face a groove to accommodate the edge of a transverse brace section running between the longitudinal beams.

4. A chassis according to claim 1 wherein the longitudinal beams are provided with webs, the webs of the longitudinal beams are provided with longitudinal ribs which form alignment grooves for one flange of the connecting pieces.

5. A chassis according to claim 4 wherein the web of the longitudinal beam comprises a relatively tall upper web and a lower web with a groove accommodating the end of the upper web, the height of the longitudinal beam being variable over its length.

6. A chassis according to claim 5 wherein openings are provided in the web of the longitudinal beams and blind recesses are provided in the outer frame which are slightly larger in cross-section than the transverse beams.

7. A chassis according to claim 1 wherein the outer-frame is reinforced to perform a load-bearing function and is formed as hollow sections and provided with appropriately shaped blind recesses to accommodate the transverse beams.

8. A chassis according to claim 1 wherein the nut engaging in said channel is in the form of parallelogram-shaped clamping pieces, the height (h) of which is smaller than the width (b) of the entry slit of the undercut channel.

9. A chassis according to claim 1 wherein the outer frame comprises longitudinal and transverse sections, the longitudinal and transverse sections of the outer frame have mitered ends and are joined together by angle-pieces such that the flanges of the angle-piece are secured by means of a threaded bolt and a nut, preferably parallelogram-shaped, which engages behind the edges of the undercut channel.

10. A chassis according to claim 1 wherein the transverse beam is in the form of a hollow girder and one undercut channel is situated at the same height on opposite sides of the transverse beam.

* * * * *